Aug. 29, 1972 C. E. RUFF 3,687,792
DECORATIVE TRIM STRIP
Filed Nov. 25, 1969
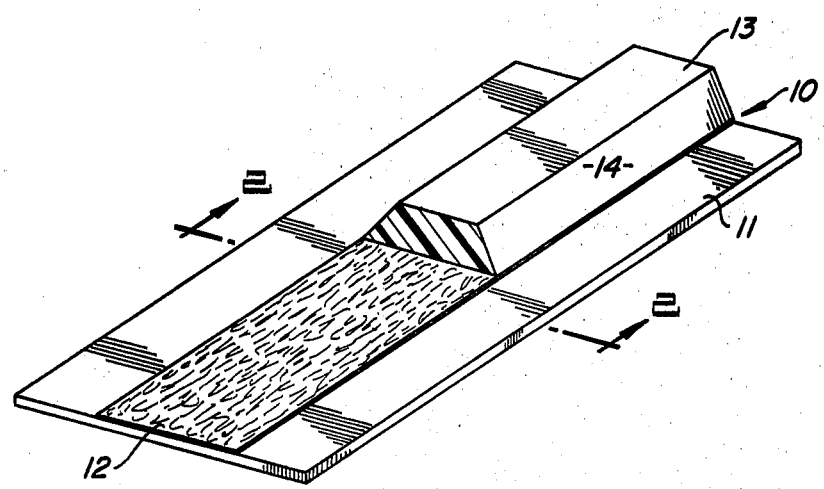
Fig. 1
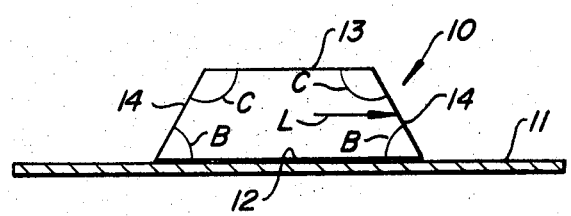
Fig. 2
Fig. 3
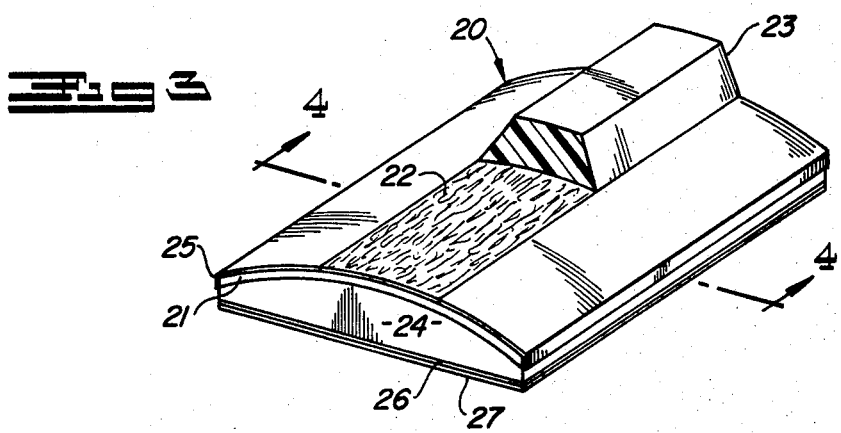
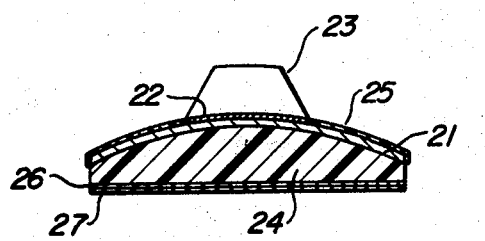
Fig. 4
INVENTOR.
CHARLES E. RUFF
BY
Meyer, Tilberry & Body
ATTORNEYS United States Patent Office 3,687,792
Patented Aug. 29, 1972

3,687,792
DECORATIVE TRIM STRIP
Charles Ernest Ruff, Lakewood, Ohio, assignor to The
Standard Products Company, Cleveland, Ohio
Filed Nov. 25, 1969, Ser. No. 879,754
Int. Cl. B44f 1/00; B60r 13/02
U.S. Cl. 161—4                                              24 Claims

ABSTRACT OF THE DISCLOSURE

A decorative trim strip including a decorative surface and a bumper bonded thereon is disclosed. A pigmented pattern conforming to the plan of the bumper is provided on the decorative surface, and a clear plastic bumper is bonded to the decorative surface and superimposed on the pigmented pattern so that the plastic bumper assumes the color of the pigmented pattern.

---

The present invention pertains to trim strip and the production thereof, and more particularly, to decorative trim strip with an apparently colored bumper and the production thereof.

Decorative trim strips including a metal strip having a decorative surface and being filled with a plastic material, a pressure sensitive adhesive backing affixed to the plastic filling material for applying the trim strip to the surface to be trimmed and a plastic bumper bonded to the decorative surface for the protection thereof are well known in the art.

Decorative trim strips are widely used in the automotive industry, but their use is not limited thereto. For example, decorative trim strips can be used in aircraft interiors or in marine interiors. Trim strips can also be employed for any other decorative purpose, either for interior or exterior use.

The decorative effects of such trim strips are frequently enhanced by varying the geometric shape of the plastic bumper and/or its color. Plastic bumpers are commonly extruded onto the decorative surface of the trim strip. Most frequently, the plastic bumper is extruded onto the trim strip simultaneously with the extrusion of the plastic filling material. The shape of the platsic bumper can readily be changed by replacing one extrusion dye with another. However, when it is desired to change the color of the plastic bumper, the entire extrusion apparatus must be thoroughly cleaned to minimize the mixing of the colored plastic materials.

When the entire extrusion apparatus must be cleaned, production must be halted. Thus, in addition to involving additional cleaning operations, the entire processing operation must be interrupted.

The present invention contemplates new and improved trim strip and methods of producing such trim strips which overcome all of the above-referred problems and others and provides trim strips with colored bumpers that appear much deeper in color by a more economical process.

In accordance with the present invention, a decorative trim strip of the general type described is provided wherein the plastic bumper is clear and colorless plastic and is bonded to the decorative surface over a pigmented pattern so that the plastic bumper has the appearance of having the same color of the pigmented pattern.

Further in accordance with the present invention, a decorative trim strip of the general type described is provided wherein a clear and colorless plastic bumper is bonded to a decorative surface so that the angle formed by the plastic bumper and the decorative surface is less than about 90° minus the critical angle, the value of the critical angle being ascertained from the following relationship:

$$\sin A = \frac{1}{\text{R.I.}}$$

wherein A is the critical angle and R.I. is the refractive index of the material of which the clear plastic bumper is made. Advantageously, all other interior angles formed by the intersection of more than two surfaces of the plastic bumper are less than 180° so that any light transmitted through said plastic bumper is totally reflected to the pigmented pattern whereby light is totally absorbed when the pigmented pattern is black or only light of the color of the pigmented pattern is reflected.

The principal object of the present invention is to provide a decorative trim strip having a clear plastic bumper which appears to possess the color of a pigmented pattern placed therebeneath.

Another object of the present invention is to provide a process for producing decorative trim strips with plastic bumpers thereon, the plastic bumpers being clear plastic but appearing to possess the color of pigmented patterns therebelow.

The invention may take physical form in certain parts and arrangements of parts, a preferred embodiment which will be described in detail in this specification and illustrated in the accompanying drawings which form a part hereof and wherein:

FIG. 1 is a pictorial view, partly in section, of a trim strip in accordance with the present invention;

FIG. 2 is a cross-sectional view of a trim strip shown in FIG. 1 and taken along the line 2—2 in FIG. 1;

FIG. 3 is a pictorial view, partly in section, of a preferred trim strip in accordance with the present invention; and FIG. 4 is a cross-sectional view of the trim strip in FIG. 3 taken along the line 4—4 in FIG. 3.

Referring now to the drawings wherein the showings are for the purpose of illustrating the preferred embodiments of the invention only and not for the purposes of limiting same, FIG. 1 shows a trim strip in accordance with the present invention which is generally shown at 10 and comprises a decorative surface 11, a pigmented pattern 12 applied to the decorative surface and a clear plastic bumper 13 bonded to the decorative surface superimposed on and coetxensive with the pigmented pattern 12.

The decorative surface 11 can be made of any suitable material and can be metallic or non-metallic. Since decorative trim strips are most frequently used in the automotive industry and/or in the aircraft industry, the decorative surface 11 will be a thin metal strip of either aluminum or stainless steel with stainless steel being preferred. The decorative surface 11 as illustrated in FIGS. 1 and 2 is a flat strip. However, as is well understood to those skilled in the art, decorative trim strips are often employed to also serve the function of protecting the surfaces to which they are applied so that such trim strips are not generally flat as illustrated in FIG. 1 but have a shape conducive to providing physical interference with the surfaces to which they are applied. The clear plastic bumper 13 can be made out of any clear (transparent) and colorless plastic. Thus, acrylic copolymers, cast allyl resins, fluorinated ethylene propylene, polyvinylidene fluoride, polycarbonates, polyesters, polyethylene, unmodified polypropylene, polystyrene, silicones, urethanes, and vinyl polymers including vinyl butyral and polyvinyl chlorides can be employed for the plastic bumper.

An important feature of the present invention is the angle at which the clear plastic bumper 13 meets the decorative surface 11. A better understanding of this portion of the invention can be had by reference to FIG. 2. Advantageously, sides 14 of clear plastic bumper 13 are designed to meet decorative strip 11 at an interior angle, B, which interior angle is equal to or less than about 90° minus the critical angle for the particular plastic employed. The critical angle for the specific plastic employed can be readily ascertained as pointed out hereinbefore. Thus, any light, as represented by arrow L, that is transmitted through clear plastic bumper 13 and parallel to pigmented pattern 12 strikes the interior side 14 at such an angle that it is reflected by that interior side into pigmented stripe 12 where it is either totally absorbed if the pigmented stripe is black or light corresponding to the color of the stripe 12 is reflected through the plastic bumper 13. Any light striking pigmented pattern 12, either directly or by internal reflection, assumes the color of the pigmented pattern 12 and appears much deeper than if the plastic bumper 13 actually possessed the color.

Clear plastic bumper 13 can be of any preselected geometric shape as long as the sides 14 meet the decorative surface 11 at the hereinbefore specified angles and as long as all interior angles formed by the intersection of two surfaces of the plastic bumper 13 are less than 180°. Advantageously, all interior angles, other than those formed by the sides meeting the decorative surface 11, are equal to 90° plus the critical angle in order to insure total internal reflection of any light transmitted through the clear plastic bumper 13 so that the reflected light strikes pigmented pattern 12 to be wholly or partially absorbed thereat. Most commonly, the plastic bumper 13 will assume the shape of an isosceles trapezoid as illustrated in FIGS. 1 and 2 with base angles, B, being less than about 90° minus the critical angle and with the upper angles C being greater than 90° plus the critical angle. When the clear plastic bumper 13 has a cross-sectional shape of an isosceles triangle or trapezoid the width and height thereof are automatically controlled to insure that any light transmitted through the clear plastic bumper 13 is totally reflected internally to strike pigmented pattern 12 whereby the bumper assumes the color of the pigmented pattern.

The index of refraction of the material out of which the plastic bumper is made determines both the angle at which the sides of the plastic bumper meet the decorative surface 11 and all interior angles of the clear plastic bumper 13. Indices of refraction for various materials, ranges of critical angles, and the angles at which the sides of the plastic bumper can meet the decorative surface and interior angles are given in Table I. From all the data given in Table I, it is readily seen that for all the materials listed an interior angle of less than about 40°, e.g. about 39.5° will suffice to give total internal reflection and will thus be sufficient to insure that the plastic bumper assumes the color of the pigmented pattern. In most instances, angles of less than 45° or even less than 48° are sufficient to provide total internal reflection.

TABLE I

| Plastic | Index of refraction | Sin A | Critical angle A | B | C |
|---|---|---|---|---|---|
| Acrylic plastics | 1.45–1.6 | 0.69–0.625 | 43.5°–38.5° | 46.5°–41.5° | 133.5°–128.5° |
| Cast allyl resins | 1.5–1.6 | 0.667–0.625 | 42°–38.5° | 48°–41.5° | 132°–128.5° |
| Fluorinated rthylene propylene | 1.3–1.4 | 0.77–0.715 | 50.5°–45.5° | 39.5°–44.5° | 140.5°–135.5° |
| Polyvinylidene fluoride | 1.4–1.45 | 0.715–0.69 | 45.5°–43.5° | 44.5°–46.5° | 135.5°–133.5° |
| Polycarbonates | 1.5–1.6 | 0.667–0.625 | 42°–38.5° | 48°–51.5° | 138°–141.5° |
| Polyesters | 1.5–1.6 | 0.667–0.625 | 42°–38.5° | 48°–51.5° | 138°–141.5° |
| Polyethylene | 1.5–1.6 | 0.667–0.625 | 42°–38.5° | 48°–51.5° | 138°–141.5° |
| Unmodified polypropylene | 1.45–1.55 | 0.69–0.645 | 43.5°–40° | 46.5°–50° | 136.5°–140° |
| Polystyrene | 1.55–1.65 | 0.645–0.605 | 40°–37° | 50°–53° | 140°–143° |
| Urethanes | 1.5–1.6 | 0.667–0.625 | 42°–38.5° | 48°–41.5° | 138°–131.5° |
| Vinyl polymers: | | | | | |
| Vinyl butyral | 1.45–1.50 | 0.69–0.667 | 43.5°–42° | 46.5°–48° | 136.5°–138° |
| Polyvinyl chloride | 1.5–1.6 | 0.667–0.625 | 42°–38.5° | 48°–51.5° | 138°–141.5° |

FIGS. 3 and 4 illustrate a preferred embodiment of the present invention. The trim strip is represented generally at 20 and comprises a stainless steel decorative surface 21. It will be noted that the decorative surface 21 has a generally convex shape. The decorative surface 21 has provided thereon a pigmented stripe 22 which can be applied by numerous techniques as pointed out hereinafter. The trim strip 20 is provided with a clear plastic, e.g. polyvinyl chloride, bumper 23 which is superimposed upon and coextensive with pigmented stripe 22. During the application of clear plastic bumper 23, the trim strip 21 is filled, as indicated at 24, with the same plastic material as clear plastic bumper 23 and the decorative surface of the trim strip is provided with a thin protective shield 25 made of the same clear plastic material. The surface of the filling 24 is provided with a pressure sensitive tape 26 so that the trim strip can be applied to the desired surface. In order to protect the pressure sensitive tape 26, the tape is provided with a protective surface 27. The protective surface can be made of paper or other protective material.

The trim strip in accordance with the present invention can be manufactured by providing a decorative surface, applying a pigmented pattern to the decorative surface, and extruding a plastic bumper onto the decorative surface and superimposed upon and coextensive with the pigmented pattern with the sides of the plastic bumper meeting the decorative surface at an angle of less than 90° minus the critical angle. In carrying the invention into practice, the decorative surface will most often be an aluminum or stainless steel strip having a convex decorative outer surface and will be filled with a plastic material. A pigmented pattern, generally a stripe, will be applied to the decorative surface by painting, spraying, or even by application of a colored tape, and a clear plastic material will be extruded upon and into the decorative strip so that the strip will be filled and provided with a clear plastic shield along with a bumper being extruded upon and coextensive with the pigmented pattern. Thereafter a pressure sensitive backing can be applied to the filled strip.

It will be appreciated by those skilled in the art that a plurality of bumpers can be extruded on the decorative surface simultaneously. Moreover, such plurality of bumpers can be extruded on the decorative surface from separate exturders from which different plastic materials are extruded. When a plurality of bumpers are so extruded, the pigmented patterns can, of course, be of different colors.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the present invention.

Having thus described my invention, I claim:

1. An improved trim surface including a decorative surface; a pigmented pattern on said decorative surface; and a substantially clear and colorless plastic bumper bonded to the decorative surface and superimposed on and substantially coextensive with said pigmented pattern, the sides of said bumper meeting the decorative surface at an angle of less than 90° minus the critical angle of the clear plastic material so that any light transmitted through said bumper in a direction substantially parallel to the surface of said pigmented pattern is substantially totally reflected into said pigmented pattern by the sides of said bumper.

2. An improved decorative trim strip including a decorative surface; a pigmented pattern on said decorative surface; and a substantially clear and colorless plastic bumper bonded to the decorative surface and superimposed and substantially coextensive with the pigmented pattern, the sides of the bumper forming an interior angle with the decorative surface of less than 90° minus the critical angle of the clear plastic material and all other interior angles formed by the intersection of two surfaces of the clear plastic bumper being less than 180° so that any light transmitted through said bumper in a direction substantially parallel to the pigmented pattern is substantially totally reflected ino said pigmented pattern by said sides.

3. The improved decoraive trim strip described in claim 2 wherein said other interior angles are more than about 90° plus the critical angle.

4. The improved decorative trim strip described in claim 3 wherein said bumper has a cross-section shape of an isosceles trapezoid.

5. The improved decorative trim strip described in claim 2 wherein said bumper is made of a plastic selected from the group consisting of acrylic copolymers, cast allyl resins, fluorinated ethylene propylene, polyvinylidene fluoride, polycarbonates, polyesters, polyethylene, unmodified polypropylene, polystyrene, silicones, urethanes, and vinyl polymers including vinyl butyral and polyvinyl chlorides.

6. The improved decorative trim strip described in claim 5 wherein said bumper is made of polyvinyl chloride.

7. The improved decorative trim strip described in claim 2 wherein the sides of said bumper meet the decorative surface at an angle of less than about 48°.

8. The improved decorative trim strip described in claim 2 wherein the sides of said bumper meet the decorative surface at an angle of less than about 45°.

9. The improved decorative trim strip described in claim 2 wherein the sides of said bumper meet the decorative surface at an angle of less than about 40°.

10. An improved trim strip including a generally convex metallic decorative surface; a pigmented pattern on said decorative surface; a substantially clear and colorless plastic filling, providing said decorative surface with a coating and forming a bumper on said decorative surface so that the bumper is superimposed on and coextensive with said pigmented pattern, the sides of said bumper forming an interior angle with said trim surface of less than about 90° minus the critical angle of the plastic material if which the bumper is made, whereby the bumper appears to possess the color of said pigmented pattern.

11. The trim strip described in claim 10 wherein the cross-secrional shape of said bumper is an isosceles trapezoid with a base angle of less than about 45°.

12. The trim strip described in claim 10 wherein all other interior angles in said bumper are less than 180°.

13. The improved decorative trim strip described in claim 12 wherein said other interior angles are more than about 90° plus the critical angle.

14. The improved decorative trim strip described in claim 13 wherein the decorative surface has a plurality of pigmented patterns and a plurality of clear and colorless plastic bumpers are superimposed therein.

15. The improved decorative trim strip described in claim 14 wherein said plastic bumpers are made of different materials.

16. The improved decorative trim strip described in claim 15 wherein said plurality of pigmented patterns are of different colors.

17. The improved decorative trim strip described in claim 12 wherein said bumper has a cross-section shape of an isosceles trapezoid.

18. The improved decorative trim strip described in claim 10 wherein said bumper is made of a plastic selected from the group consisting of acrylic copolymers, cast allyl resins, fluorinated ethylene propylene, polyvinylidene fluoride, polycarbonates, polyesters, polyethylene, unmodified polypropylene, polystyrene, silicones, urethanes, and vinyl polymers including vinyl butyral and polyvinyl chlorides.

19. The improved decorative trim strip described in claim 18 wherein said bumper is made of polyvinyl chloride.

20. The improved decorative trim strip described in claim 10 wherein the sides of said bumper meet the decorative surface at an angle of less than about 48°.

21. The improved decorative trim strip described in claim 10 wherein the sides of said bumper meet the decorative surface at an angle of less than about 45°.

22. The improved decorative trim strip described in claim 10 wherein the sides of said bumper meet the decorative surface at an angle of less than about 40°.

23. An improved decorative trim strip including: an elongated decorative surface; a stripe pattern on said decorative surface of a color other than the color of said decorative surface and having a width substantially narrower than the width of said decorative surface; and a strip of substantially clear and colorless plastic of substantial thickness overlying said stripe pattern and bonded to said decorative surface, said clear strip corresponding in width substantially to the width of said stripe pattern and being coextensive therewith, at least a portion of the outer surface of said clear strip extending at an angle to said decorative surface of less than 90° minus the critical angle of the clear plastic so that light transmitted through said portion of said outer surface of said clear strip in a direction generally parallel to the surface of said stripe pattern is reflected into said pattern by said portion of the outer surface, whereby said clear strip appears to possess the color of said stripe pattern.

24. An improved decorative trim strip including a generally convex metallic decorative surface; a stripe pattern on said decorative surface of a color contrasting with the color of said decorative surface and having a width substantially narrower than the width of said decorative surface; and a strip of substantially clear and colorless plastic of substantial thickness overlying said stripe pattern and bonded to said decorative surface, said clear strip corresponding in width substantially to the width of said stripe pattern and being coextensive therewith, at least a portion of the outer surface of said clear strip extending at an angle to said decorative surface of less than 90° minus the critical angle of the clear plastic so that light transmitted through said portion of said outer surface of said clear strip in a direction generally parallel to the surface of said stripe pattern is reflected into said pattern by said portion of the outer surface, whereby said clear strip appears to possess the color of said stripe pattern.

References Cited

UNITED STATES PATENTS

| | | | |
|---|---|---|---|
| 3,226,287 | 12/1965 | Shanor et al. | 161—175 |
| 1,090,278 | 3/1914 | Coates | 350—286 |
| 2,149,171 | 2/1939 | Grote | 350—97 X |

(Other references on following page)

| UNITED STATES PATENTS | | | |
|---|---|---|---|
| 3,471,355 | 10/1969 | Truesdell et al. | 161—40 |
| 3,506,294 | 4/1970 | Newman | 293—71 X |
| 1,908,075 | 5/1933 | Stalder | 117—45 X |
| 2,066,341 | 1/1937 | Eichstadt | 117—45 |
| 2,554,692 | 5/1951 | Backman | 161—2 X |
| 3,509,001 | 4/1970 | Shanok et al. | 161—6 X |
| 3,543,465 | 12/1970 | Jackson | 52—716 |

FOREIGN PATENTS 870,020　6/1961　Great Britain　161—5

ROBERT F. BRUNETT, Primary Examiner

J. C. GIL, Assistant Examiner

U.S. Cl. X.R.

52—716; 161—5, 6, 39, 40, 119, 406; 293—1, 62